US006096992A

United States Patent [19]

Severance, Jr.

[11] Patent Number: 6,096,992

[45] Date of Patent: Aug. 1, 2000

[54] LOW CURRENT WATER INJECTION NOZZLE AND ASSOCIATED METHOD

[75] Inventor: Wayne Stanley Severance, Jr., Darlington, S.C.

[73] Assignee: The ESAB Group, Inc., Florence, S.C.

[21] Appl. No.: 09/240,992

[22] Filed: Jan. 29, 1999

[51] Int. Cl.[7] .......... B23K 9/00

[52] U.S. Cl. .......... 219/121.5; 219/121.51; 219/121.49; 219/121.59

[58] Field of Search .......... 219/121.5, 121.51, 219/121.48, 121.39, 121.59, 74.75, 121.49, 231.31, 231.41

[56] References Cited

U.S. PATENT DOCUMENTS

| | | | |
|---|---|---|---|
| 3,366,772 | 1/1968 | Wickham et al. . | |
| 3,567,898 | 3/1971 | Fein | 219/75 |
| 4,311,897 | 1/1982 | Yerushalmy . | |
| 4,361,748 | 11/1982 | Couch, Jr. | 219/121.5 |
| 4,590,354 | 5/1986 | Marhic et al. . | |
| 4,743,734 | 5/1988 | Garlanov et al. . | |
| 4,913,405 | 4/1990 | Van Der Have et al. . | |
| 4,954,688 | 9/1990 | Winterfeldt . | |
| 5,079,403 | 1/1992 | Sturges et al. . | |
| 5,124,525 | 6/1992 | Severance, Jr. et al. . | |
| 5,132,512 | 7/1992 | Sanders et al. . | |
| 5,308,949 | 5/1994 | Reed, Jr. et al. . | |
| 5,317,126 | 5/1994 | Couch, Jr. et al. . | |
| 5,393,952 | 2/1995 | Yamaguchi et al. | 219/121.5 |
| 5,396,043 | 3/1995 | Couch, Jr., et al . | |
| 5,660,743 | 8/1997 | Nemchinsky . | |
| 5,747,767 | 5/1998 | Severance et al. . | |

*Primary Examiner*—Mark Paschall
*Attorney, Agent, or Firm*—Alston & Bird LLP

[57] ABSTRACT

A water injection plasma arc torch having a nozzle assembly positioned adjacent the discharge end of the electrode of the torch, wherein the torch is capable of operating at a current of 200 amperes or less. The nozzle assembly comprises an inner nozzle mounted adjacent an outer nozzle wherein both inner and outer nozzles have concentric bores for passage of the arc and the plasma gas flow to a workpiece. In addition, the inner nozzle is spaced from the outer nozzle to define a water passage therebetween for directing a flow of water to surround the plasma arc. A gas flow velocity of between about 40 times and about 110 times the water flow velocity provides constriction of the plasma arc, without unduly cooling the plasma arc, and produces good quality straight and bevel cuts in thin section workpieces.

31 Claims, 3 Drawing Sheets

LOW CURRENT WATER INJECTION NOZZLE AND ASSOCIATED METHOD

FIELD OF THE INVENTION

The present invention relates to plasma arc cutting torches and, more particularly, to a nozzle for a water injection plasma arc cutting torch wherein the nozzle is particularly capable of operating at low current levels.

BACKGROUND OF THE INVENTION

Plasma arc torches are commonly used for high speed, high precision cutting of metals. These torches use a transferred arc mode of operation wherein the torch includes an electrode which supports an arc extending from the electrode to a workpiece. Generally, a gas is energized by the arc to produce a plasma. The produced plasma arc is then directed by the plasma arc torch through a nozzle and toward the workpiece to be cut. The characteristics of the cut produced in the workpiece by the plasma arc are dependent upon different factors including torch operational parameters, the configuration of the nozzle, and the characteristics of the workpiece. Further, it is well known in the art that improved torch operation is obtained by injecting a flow of water through the nozzle to surround the plasma arc, thereby constricting the plasma and increasing the cutting ability of the torch. The water flow is also helpful to cool the nozzle, which increases its operational life. Water injection torches are also advantageous in cutting 0.5 inch and thicker material because of the improved bevel angle, i.e., a more "square" cut can be obtained. Further, water injection torches exhibit less "top edge rounding" where the corners of the cut edge closest to the torch become undesirably rounded as a result of the heat. Thus, water injection plasma arc cutting torches are dependent upon many factors for proper operation under various service demands. However, a common characteristic of conventional water injection plasma arc torches is the use of a high operational current, generally greater than 200 amperes, to maintain a sufficient plasma arc.

When cutting thin section workpieces, such as metal plates having a thickness of less than about 0.5 inches, it is desirable to use less current than with thicker workpieces. A lower current is more efficient. While it is theoretically possible to use a high current rating torch and simply reduce the current through the torch (such as using a 400 amp torch with only 200 amps of current), the resultant arc is "bushier" and less stiff, resulting in a cut which is not sufficiently uniform. In addition, the conventional view is that water injection is impractical for use with low current plasma arc torches, which generally operate at a current of 200 amperes or less, due to the energy depleting effect of the water on the plasma. The water can also deflect the arc in one direction so that the bevel angle of the cut depends in part on the direction of movement of the torch relative to the workpiece. As such, a secondary gas flow is used to cool the nozzle and constrain the arc for low current applications.

A secondary gas flow is less efficient than water in providing cooling adjacent the cut in the workpiece and, compared to water injection torches, produces a lower quality cut. One example is U.S. Pat. No. 5,132,512 to Sanders et al. which discloses a plasma arc torch capable of operating at currents of 200 amperes or less. This torch uses an insulated shield on the tip of the nozzle to guide and regulate a secondary gas flow through the nozzle. The secondary gas flow surrounds the plasma arc to provide cooling and stabilize the arc. The '512 Sanders et al. patent also notes that water injection becomes less practical in the 0–200 ampere operating current range since the water draws too much energy from the plasma. Nevertheless, there exists a need for a water injection plasma arc torch capable of operating at current levels generally less than 200 amperes.

Further, U.S. Pat. No. 5,079,403 to Sturges et al. discloses a plasma arc torch capable of operating at current levels between 45–250 amperes. This torch uses a nozzle, configured to discharge the plasma at a supersonic velocity in the form of a collimated stream, to obtain faster and squarer cutting of the workpiece. This torch is further provided with cooling water circulated within the body of the torch. However, the water is intended solely for cooling the body and nozzle of the torch and does not flow through the nozzle. The water enters and exits through the body of the torch without interacting with the plasma arc. Thus, the '403 Sturges et al. patent does not disclose a water injection plasma arc torch capable of operating at low current levels.

In contrast, U.S. Pat. No. 4,311,897 to Yerushalmy discloses a water injection plasma arc torch which uses water to intensify and collimate the arc. Stated operational currents for this torch range from 275–400 amperes. Similarly, U.S. Pat. No. 5,660,743 to Nemchinsky discloses a water injection plasma arc torch which cools the nozzle assembly and constricts the arc without unduly cooling the arc. This patent states an operational current of 350 amperes. Further, U.S. Pat. No. 4,954,688 to Winterfeldt also discloses a water injection plasma arc torch . The patent gives an operating example at a current of 400 amperes.

As such, it is known to those skilled in the art that water injection plasma arc torches are desirable for cut quality, but that the operation of water injection torches below 200 amperes has not been practical. The water flow excessively lessens the energy of the arc and can deflect the arc. Accordingly, there is a need in the art for a water injection torch which can operate efficiently and effectively at less than 200 amps without suffering a deflected or depleted arc. Such a torch would also preferably be able to produce superior cut quality on thin metal plates with a very shallow bevel angle and little top edge rounding.

SUMMARY OF THE INVENTION

The above and other advantages of the present invention are achieved in the embodiment illustrated herein by the provision of a nozzle assembly for a low current water injection plasma arc torch wherein the plasma arc torch is capable of operating at current levels less than about 200 amperes. Surprisingly, it has been found by the inventor that a high plasma gas flow through the nozzle assembly permits the effective operation of the low current water injection torch according to the invention. The nozzle assembly comprises an inner nozzle which has a bore therethrough and which defines a longitudinal axis. The bore is centered on the longitudinal axis and is configured to direct the flow of a plasma gas therethrough at a minimum gas flow velocity. The nozzle assembly further comprises an outer nozzle which also has a bore therethrough and ends at a discharge opening. The bore in the outer nozzle is concentric with the bore in the inner nozzle such that the plasma gas flows through both bores and the discharge opening to a workpiece. The inner nozzle is mounted adjacent the outer nozzle, defining a water passage therebetween. The water passage is configured to direct a flow of water to surround and constrict the plasma gas flow exiting the nozzle assembly through the discharge opening. The flow of water is generally in an annular swirl pattern and at a predetermined water flow velocity.

The current is fed to an electrode mounted in the body of the torch which has a discharge end and which is coaxial with the nozzle assembly. The nozzle assembly is mounted on the end of the torch body. As such, the plasma arc torch is capable of producing and maintaining an arc extending from the discharge end of the electrode, through the nozzle assembly, to a metallic workpiece. The high gas flow is energized by the arc to produce a plasma arc. The plasma arc then flows outwardly of the nozzle assembly through the bores and the discharge opening to the workpiece. The torch of the present invention is further capable of producing a water flow at a predetermined water flow velocity in the water passage between the inner nozzle and outer nozzle of the nozzle assembly. The water flow exits the water passage to surround and constrict the plasma arc as it exits the outer nozzle through the discharge opening.

The nozzle assembly according to one embodiment of the invention, more particularly the bores of both the inner and outer nozzle and the water passage, is configured to provide a gas flow velocity which is between approximately 40 times and 110 times the water flow velocity. In general, the inner nozzle bore is less than about 0.090 inches in diameter at its minimum point, while the outer nozzle bore is less than about 0.140 inches in diameter. Additionally, the length of the bore in the outer nozzle is less than about 0.040 inches, as measured from the start of the bore to the discharge opening. The volumetric rate of gas flow to the torch can be less than about 200 standard cubic feet per hour, while the rate of water flow is less than about 0.3 gallons per minute.

In preferred embodiments of the present invention, the torch operates at a current of between about 60 amperes and 130 amperes. In alternate embodiments, the torch operates at a current up to about 150 amperes. The gas flow rate is about 100 standard cubic feet per hour, while the water flow rate is between about 0.13 gallons per minute and 0.20 gallons per minute. Further, the inner nozzle bore has a diameter of 0.070 inches and the outer nozzle bore has a diameter of 0.0995 inches to produce the necessary gas and water flow velocities. Adjustment of the operational parameters thus produces a gas flow velocity which is between about 40 times and about 110 times the water flow velocity.

Thus, the present invention provides a water injection plasma arc torch capable of operating at current levels below 200 amperes without the water flow excessively lessening the energy of the arc or deflecting the arc. As such, the low current water injection plasma arc torch of the present invention has increased cutting ability and is capable of producing superior cut quality on thin metal plates with a very shallow bevel angle and with little top edge rounding. In addition, the water injection feature of the present invention serves to cool the low current nozzle, thereby increasing its operational life.

BRIEF DESCRIPTION OF THE DRAWINGS

Some of the advantages of the present invention having been stated, others will appear as the description proceeds, when considered in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
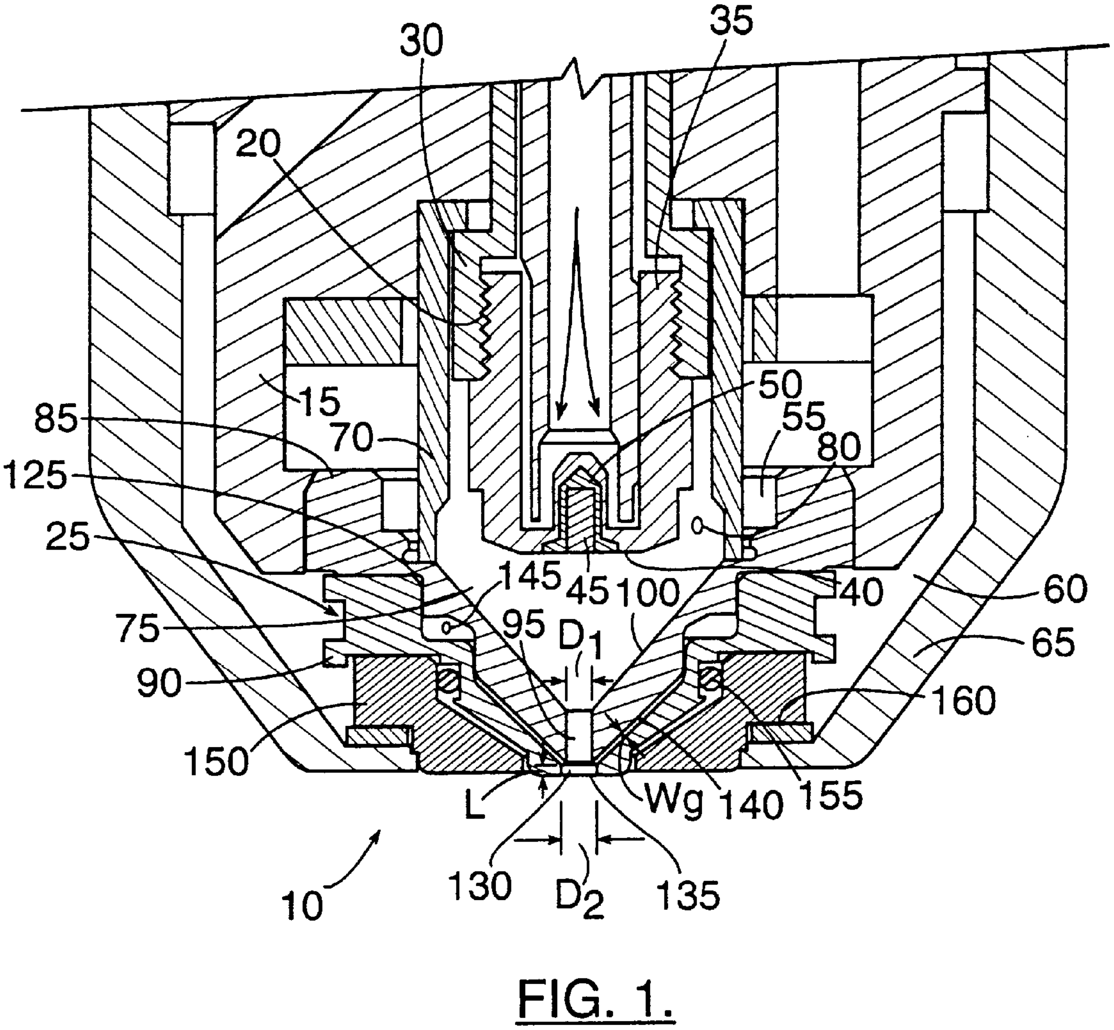
FIG. 1 is a fragmentary sectioned side elevation view of the nozzle assembly of a water injection plasma arc torch which embodies the features of the present invention.

Referring now to the drawings, and more particularly to FIG. 1, there is disclosed an embodiment of a water injection plasma arc torch, indicated generally by the numeral which includes the features of the present invention. The plasma arc torch 10 comprises a torch body 15, a tubular electrode 20 defining a longitudinal axis, and a nozzle assembly 25. The electrode 20 is preferably made of copper or a copper alloy, and it is composed of an upper tubular member 30 and a holder 35 which is threadedly connected to the upper member 30. Holder 35 is also tubularly configured and includes a transverse end wall 40 which closes the front end of the holder 35 and which defines an outer front face. An emissive element 45 is mounted in a cavity in the end wall 40 in coaxial relation with the longitudinal axis. A relatively non-emissive separator 50 may be positioned coaxially about the emissive element 45 as is typical with similar conventional devices.

As further shown in the illustrated embodiment in FIG. 1, the electrode 20 is mounted in the plasma arc torch body 15. The torch body 15 further includes a gas passageway 55 and a liquid passageway 60 and is generally surrounded by an outer housing 65.

The gas passageway 55 directs plasma gas from a suitable source (not shown) through a conventional gas baffle 70 of any suitable high temperature ceramic material and into a gas plenum chamber 75 via several radial inlet holes 80 in the wall of the baffle 70. As is well known in the art, the inlet holes are arranged to cause the gas to enter the plenum chamber 75 in a swirling manner.

The nozzle assembly 25 is mounted adjacent, and directed away from, the transverse end wall 40. The nozzle assembly 25 comprises an inner nozzle 85 and an outer nozzle 90. The inner nozzle 85 is preferably formed of copper or a copper alloy and contains a bore 95 therethrough which is coaxial with the longitudinal axis. Between the transverse end wall 40 and the bore 95, the inner nozzle 85 has an interior frusto-conical surface 100 tapering from the plenum chamber 75 to the bore 95. The interior frusto-conical surface 100 serves to direct the plasma gas through the bore 95.

Figure 2:
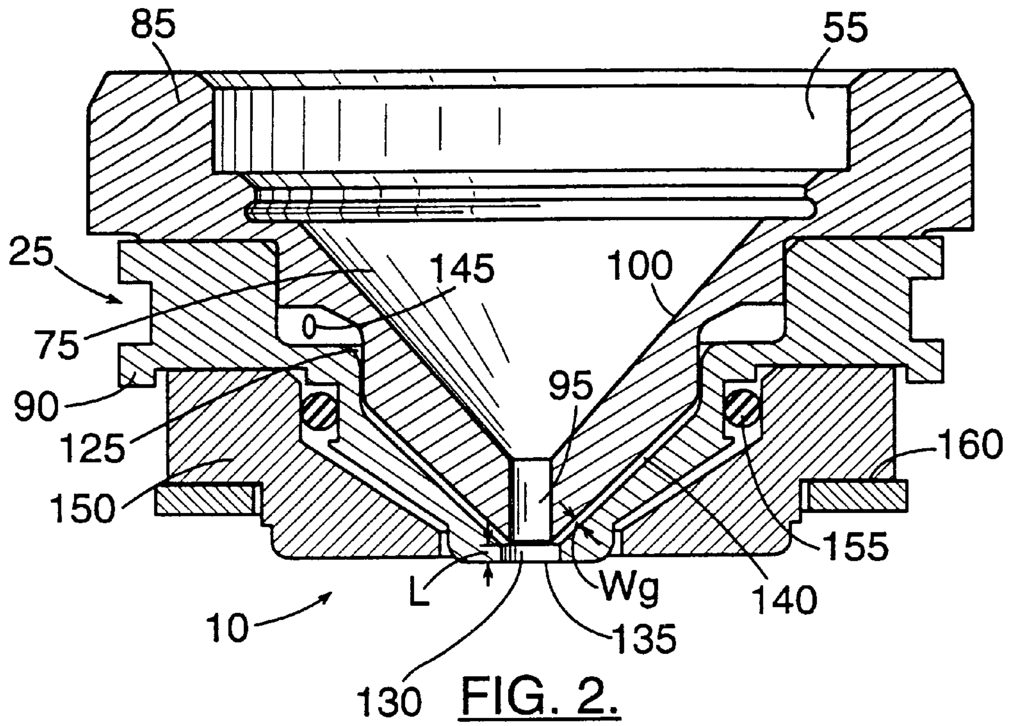
FIG. 2 is a fragmentary and enlarged sectional view of the nozzle assembly of the present invention showing an alternate configuration of the inner nozzle bore.
Figure 3:
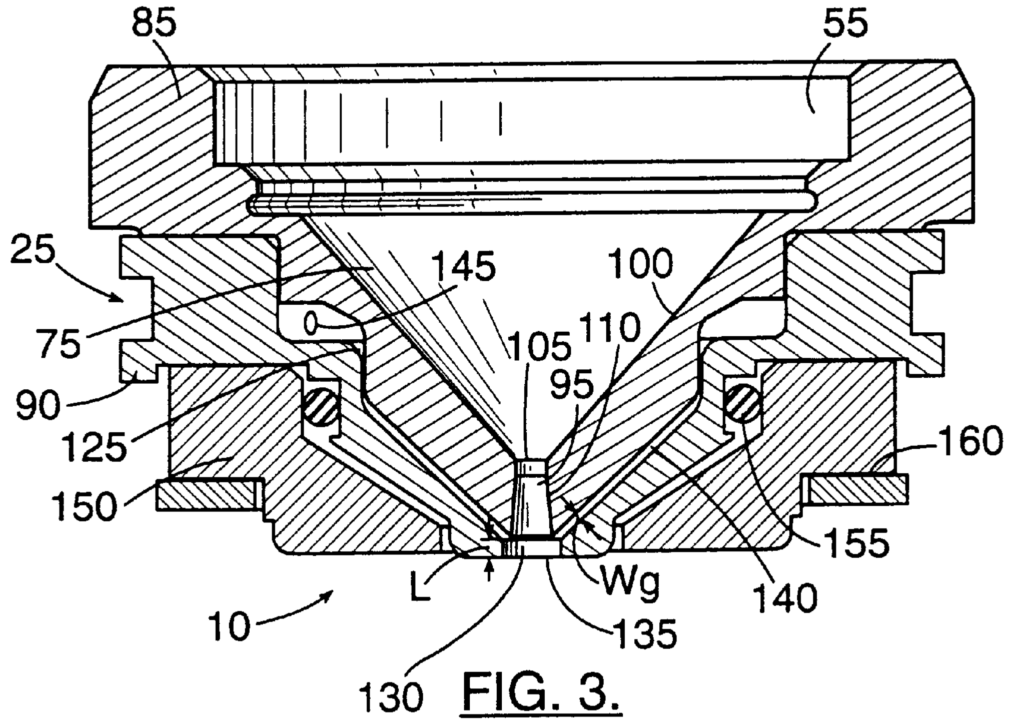
FIG. 3 is a fragmentary and enlarged sectional view of the nozzle assembly of the present invention showing another alternate configuration of the inner nozzle bore.
Figure 4:
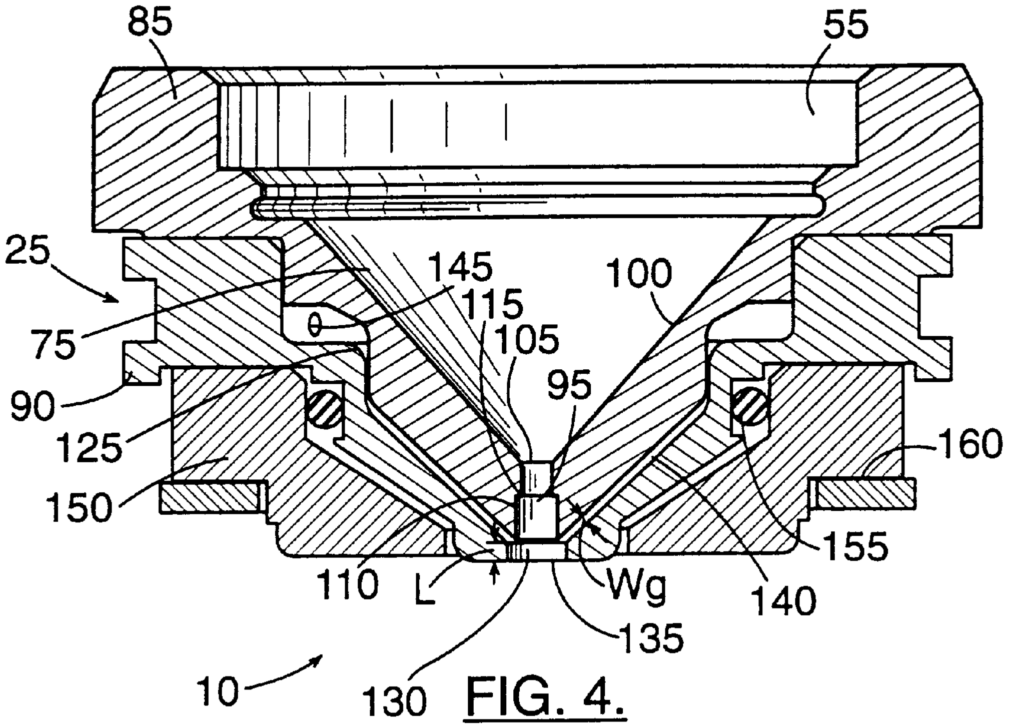
FIG. 4 is a fragmentary and enlarged sectional view of the nozzle assembly of the present invention showing another alternate configuration of the inner nozzle bore.
Figure 5:
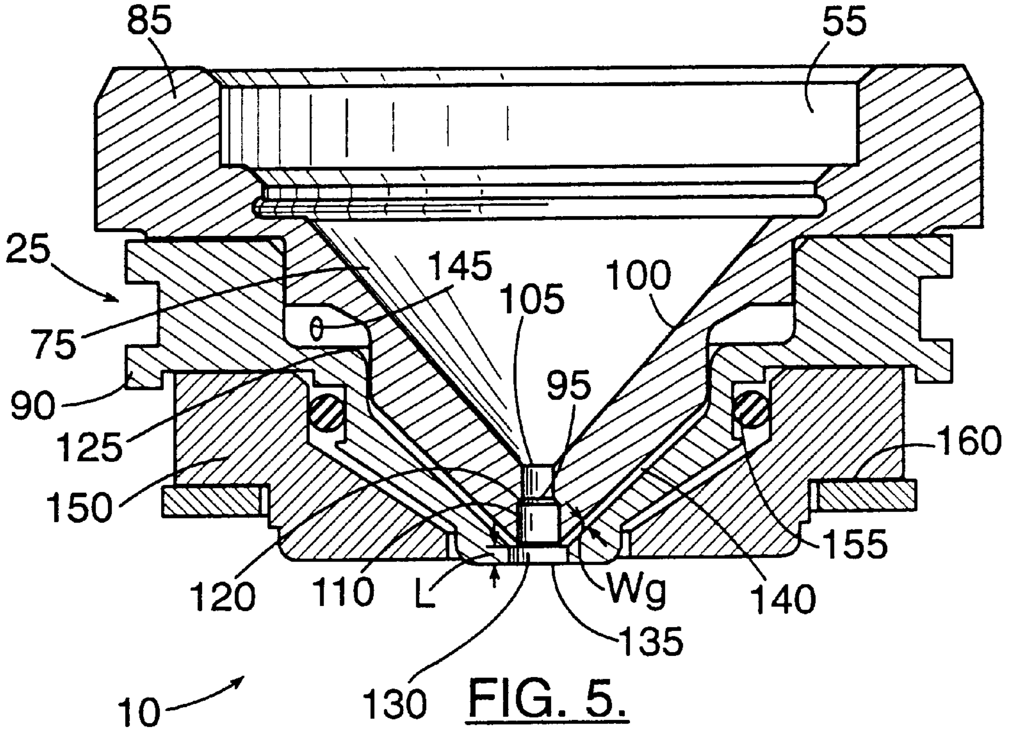
FIG. 5 is a fragmentary and enlarged sectional view of the nozzle assembly of the present invention showing another alternate configuration of the inner nozzle bore.

Now referring to FIGS. 2 through 4, the inner nozzle bore 95 may be constructed in alternate configurations. As shown in the preferred embodiment in FIG. 2, the bore 95 may have a constant diameter therethrough. In an alternate embodiment as shown in FIG. 3, the bore 95 may comprise a first bore section 105 and a second bore section 110, wherein the first bore section 105 has a constant diameter therethrough. The second bore section 110 is frusto-conical and increases in diameter in the direction away from the first bore section 105. In another alternate embodiment as shown in FIG. 4, the bore 95 may comprise a first bore section 105 and a second bore section 110, wherein the second bore section 110 has a larger diameter than the first bore section 105 and the transition between bore sections is a flat transverse face 115. Yet another alternate embodiment is shown in FIG. 5, wherein the bore 95 also comprises a first bore section 105 and a second bore section 110, wherein the second bore section 110 has a larger diameter than the first bore section 105. However, in this embodiment, the transition between bore sections is a frusto-conical section 120 increasing from the diameter of the first bore section 105 to the diameter of the second bore section 110.

Now returning to FIG. 1, the outer nozzle 90 is shown mounted adjacent the outer face of the inner nozzle 85 via an annular shoulder 125. The outer nozzle 90 is also preferably formed of copper or a copper alloy. The outer nozzle 90 further includes a bore 130 which is coaxial with the longitudinal axis and concentric with the inner nozzle bore 95. The outer nozzle bore 130 is also generally larger in diameter than the inner nozzle bore 95. Further, the end of the outer nozzle bore 130 defines a discharge opening 135. The inner nozzle 85 and outer nozzle 90 are spaced apart to define a frusto-conical water passage 140 therebetween. Water is directed into the water passageway 60 and passes through a plurality of radial ducts 145 in the outer nozzle 90 to enter the water passage 140. The ducts 145 may be tangentially inclined as to impart a swirling movement to the water as it enters and flows through the water passage 140.

A ceramic insulator 150 is secured onto the outer nozzle 90 and extends substantially along the outer surface of the outer nozzle 90. The ceramic insulator 150 helps prevent double arcing and insulates the outer nozzle 90 from heat and molten metal splatter generated during torch operation.

nozzle 85 and outer nozzle 90 assembly in a position adjacent the electrode 20.

A power source (not shown) is connected to the electrode 20 in a series circuit relationship with a metal workpiece, which typically is grounded. In operation, an electrical arc is generated and extends from the emissive element 45 of the torch 10, through the inner nozzle bore 95, the outer nozzle bore 130, the discharge opening 135, and to the workpiece. The workpiece is located adjacent and below the outer nozzle 90. The plasma arc is started in a conventional manner by establishing a pilot arc between the electrode 20 and the nozzle assembly 25. The arc is then transferred to the workpiece by being ejected through the nozzle bores 95 and 130, and discharge opening 135. The vortical flow of gas which is formed between the electrode 20 and the interior surface 100 of the inner nozzle 85, surrounds the arc and forms a plasma jet flowing through the inner nozzle bore 95. The swirling vortex of water from the water passage 140 then surrounds the plasma jet as it exits through discharge opening 135 toward the workpiece.

In embodiments of the present invention, the low current water injection plasma arc torch operates at a current of 200 amperes or less. Further, the nozzle assembly, more particularly the bores of both the inner and outer nozzle and the water passage, is configured to provide a gas flow velocity which is between approximately 40 times and 110 times the water flow velocity. The inner nozzle bore $D_1$ is less than about 0.090 inches in diameter at its minimum point, while the outer nozzle bore $D_2$ is less than about 0.140 inches in diameter. Additionally, the length L of the bore in the outer nozzle will be less than about 0.040 inches, as measured from the start of the bore to the discharge opening. Further, the torch is capable of producing the gas and water flows necessary to generate the required gas and water flow velocities, respectively. Thus, generally, the rate of gas flow will be less than about 200 standard cubic feet per hour using gases such as air, nitrogen, or oxygen, while the rate of water flow will be less than about 0.3 gallons per minute.

TABLE 1

| Nozzle | Amps | Gas Flow Rate (scfh) | $H_2O$ Flow Rate (gpm) | $D_1$ at exit (in.) | $D_2$ (in.) | Wg (in.) | L (in.) | $H_2O$ Velocity (ft/sec) | Cold Gas Velocity (ft/sec) | Cold Gas Velocity/ $H_2O$ Velocity |
|---|---|---|---|---|---|---|---|---|---|---|
| Example 1 | 260 | 100 | 0.50 | 0.109 | 0.1650 | 0.0150 | .030 +/− .007 | 20.6 | 429 | 20.8 |
| Example 2 | 260 | 100 | 0.50 | 0.109 | 0.1500 | 0.0109 | .049 +/− .007 | 31.2 | 429 | 13.6 |
| Example 3 | 260 | 100 | 0.50 | 0.109 | 0.1500 | 0.0109 | .049 +/− .007 | 31.2 | 429 | 13.6 |
| Example 4 | 300 | 170 | 0.50 | 0.116 | 0.1700 | 0.0109 | .059 +/− .004 | 27.6 | 643 | 23.2 |
| Example 5 | 340–360 | 120 | 0.50 | 0.120 | 0.1820 | 0.0135 | N/A | 20.8 | 424 | 20.4 |
| Example 6 | 260 | 100 | 0.50 | 0.109 | 0.1820 | 0.0219 | .059 +/− .004 | 12.8 | 429 | 33.5 |
| Example 7 | 300 | 120 | 0.50 | 0.109 | 0.1820 | 0.0219 | .059 +/− .004 | 12.8 | 514 | 40.1 |
| Example 8 | 65–125 | 100 | 0.20 | 0.071 | 0.0985 | 0.0074 | .020 | 28.0 | 1010 | 36.1 |
| Example 9 | 65–125 | 100 | 0.17 | 0.070 | 0.0995 | 0.0106 | .027 +/− .003 | 16.5 | 1039 | 63.2 |
| Example 10 | 65-125 | 100 | 0.13 | 0.069 | 0.1010 | 0.0137 | .030 | 9.6 | 1070 | 111.5 |

An o-ring 155 is positioned between the ceramic insulator 150 and the outer nozzle 90 to create a seal therebetween. The insulator 150 further includes a shoulder 160 which engages a lip on the outer housing 65 to secure the inner Examples of nozzles for water injection plasma arc torches are shown in Table 1. Included in Table 1 are operational parameters for such nozzles, wherein the operational current, the gas flow rate, and the water flow rate are indicated. Further, the geometric configurations of the nozzles are shown where $D_1$ is the exit diameter of the orifice constricting the plasma gas and the arc, otherwise called the inner nozzle bore, Wg is the width of the water gap, $D_2$ is the diameter of the water injection orifice, otherwise called the outer nozzle bore, and L is the length of the water injection orifice, otherwise called the length of the bore in the outer nozzle. For the various nozzle configurations, the water velocity through the nozzle is calculated as follows:

$$\text{Water velocity} = \frac{H_2O \text{ flow rate}}{(Wg)(D_2)(\pi)} \times \frac{231 \text{ in}^3}{\text{gal}} \times \frac{\text{min}}{60 \text{ sec}} \times \frac{\text{ft}}{12 \text{ in}}$$

Further, the cold gas velocity is calculated as follows:

$$\text{Cold gas velocity} = \frac{(4)(O_2 \text{ flow rate})}{(D_{1exit})^2(\pi)} \times \frac{\text{hr}}{3600 \text{ sec}} \times \frac{144 \text{ in}^2}{\text{ft}^2}$$

The cold gas velocity is the velocity of the gas flow through the nozzle in the absence of the arc or when the arc is off. In the table above, the gas used is oxygen. The cold gas velocity is used in characterizing the nozzle for definiteness reasons since the actual gas velocity with the arc on is subject to various uncertainty factors, such as the area of the orifice occupied by the arc and temperature gradients in the gas flow, which render its calculation very complex. Accordingly, from the known flow rates of both the cold gas and the water, along with the geometry of the nozzle, the ratio of the cold gas velocity to the water velocity can be readily calculated. Since this ratio is generally applicable to nozzles for water injection plasma arc cutting torches, it can be used to generally characterize such nozzles and serve as an indicator of differences therebetween. Conventional water injection torches are shown as Examples 1 through 7 in Table 1.

In a preferred embodiment of the present invention, the low current water injection plasma arc cutting torch with a low current nozzle operates at a current of between about 60 amperes and 130 amperes. In alternate embodiments, the torch operates at a current up to about 150 amperes. The gas flow rate is about 100 standard cubic feet per hour, while the water flow rate is about 0.17 gallons per minute. Further, the inner nozzle bore has a diameter of 0.070 inches and the outer nozzle bore has a diameter of 0.0995 inches to produce the necessary gas and water flow velocities. Adjustment of the operational parameters thus produces a gas flow velocity which is about 63 times the water flow velocity. This particular configuration of a preferred embodiment is indicated as Example 9 in Table 1.

Table 1 includes farther preferred embodiments of low current water injection plasma arc cutting torches as shown in Examples 8 and 10. Salient features appear when comparing the low current nozzles to the high current nozzles of Examples 1 through 7. More particularly, the ratio of cold gas velocity to water velocity is typically higher for the low current nozzle and in the range of about 40 to about 110. The larger ratio is the result of a much higher cold gas velocity for the low current nozzles. A low water flow rate also contributes to the high ratio. In addition, the length of the outer nozzle bore L is generally less than that of the high current nozzles. While not wishing to be bound by theory, the inventor speculates that the reason these parameters are advantageous for a low current water injection torch is because the high gas flow helps to strengthen the arc, while the low water flow and the short length of the outer nozzle bore minimizes the interaction of the water with the arc, thus reducing the energy depleting effect of the water thereon.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A nozzle assembly for a water injection plasma arc torch capable of operating at low current levels, said nozzle assembly comprising:

inner nozzle means defining a longitudinal axis and a bore centered around said axis, said inner nozzle means for directing a gas flow though said bore at a predetermined gas flow velocity; and outer nozzle means defining a bore concentric with said inner nozzle bore such that the gas flows through both bores to a workpiece, said outer nozzle means being mounted adjacent to said inner nozzle means to define a water passage means therebetween for directing a water flow at a predetermined water flow velocity to surround the gas flow, said gas flow velocity being at least about 40 times the water flow velocity.

2. A nozzle assembly according to claim 1 wherein the inner nozzle bore is less than about 0.090 inches in diameter.

3. A nozzle assembly according to claim 1 wherein the outer nozzle bore is less than about 0.140 inches in diameter.

4. A nozzle assembly according to claim 1 wherein the outer nozzle bore is less than about 0.040 inches in length.

5. A nozzle assembly according to claim 1 wherein the gas flow has a volumetric flow rate of less than about 200 standard cubic feet per hour.

6. A nozzle assembly according to claim 1 wherein the water flow has a volumetric flow rate of less than about 0.3 gallons per minute.

7. A nozzle assembly according to claim 1 wherein the gas flow velocity is between about 40 times and about 110 times the water flow velocity.

8. A nozzle assembly according to claim 1 wherein the inner nozzle bore comprises a first bore section and a second bore section, said second bore section defining an exit end of the inner nozzle bore, said exit end having a diameter greater than the first bore section.

9. A nozzle assembly according to claim 1 wherein the inner nozzle bore is about 0.070 inches in diameter.

10. A nozzle assembly according to claim 9 wherein the outer nozzle bore is about 0.0995 inches in diameter.

11. A nozzle assembly according to claim 10 wherein the gas flow has a volumetric flow rate of about 100 standard cubic feet per hour.

12. A nozzle assembly according to claim 11 wherein the water flow has a volumetric flow rate of between about 0.13 gallons per minute and about 0.20 gallons per minute.

13. A nozzle assembly according to claim 12 wherein said nozzle assembly is used in a water injection plasma arc torch capable of operating at a current level of between about 60 amperes and about 130 amperes.

14. A nozzle assembly according to claim 12 wherein said nozzle assembly is used in a water injection plasma arc torch capable of operating at a current level up to about 150 amperes.

15. A water injection plasma arc torch capable of operating at low current levels, said torch comprising:

a torch body;

a water supply conduit operably connected to said torch body;

a plasma gas supply conduit operably connected to said torch body;

an electrode operably connected to said torch body and defining a longitudinal axis;

inner nozzle means defining a bore centered around said longitudinal axis and for directing a plasma gas flow through said bore at a predetermined gas flow velocity; and outer nozzle means defining a bore concentric with said inner nozzle bore such that the plasma gas flows through both bores to a workpiece, said outer nozzle means being mounted adjacent to said inner nozzle means to define a water passage means therebetween for directing a water flow at a predetermined water flow velocity to surround the plasma gas flow, said gas flow velocity being at least about 40 times the water flow velocity.

16. A water injection plasma arc torch according to claim 15 wherein the inner nozzle bore is less than about 0.090 inches in diameter.

17. A water injection plasma arc torch according to claim 15 wherein the outer nozzle bore is less than about 0.140 inches in diameter.

18. A water injection plasma arc torch according to claim 15 wherein the outer nozzle bore is less than about 0.040 inches deep.

19. A water injection plasma arc torch according to claim 15 wherein the gas flow has a corresponding flow rate of less than about 200 standard cubic feet per hour.

20. A water injection plasma arc torch according to claim 15 wherein the water flow has a corresponding flow rate of less than about 0.3 gallons per minute.

21. A water injection plasma arc torch according to claim 15 wherein the gas flow velocity is between about 40 times and about 110 times the water flow velocity.

22. A water injection plasma arc torch according to claim 15 wherein the inner nozzle bore comprises a first bore section and a second bore section, said second bore section defining an exit end of the inner nozzle bore, said exit end having a diameter greater than the first bore section.

23. A water injection plasma arc torch according to claim 15 wherein the inner nozzle bore is about 0.070 inches in diameter.

24. A water injection plasma arc torch according to claim 23 wherein the outer nozzle bore is about 0.0995 inches in diameter.

25. A water injection plasma arc torch according to claim 24 wherein the gas flow has a corresponding flow rate of about 100 standard cubic feet per hour.

26. A water injection plasma arc torch according to claim 25 wherein the water flow has a corresponding flow rate of between about 0.13 gallons per minute and about 0.20 gallons per minute.

27. A water injection plasma arc torch according to claim 26 wherein the water injection plasma arc torch operates at a current level of between about 60 amperes and about 130 amperes.

28. A water injection plasma arc torch according to claim 26 wherein the water injection plasma arc torch operates at a current level up to about 150 amperes.

29. A water injection plasma arc torch capable of operating at low current levels, said torch comprising:

a torch body;

a water supply conduit operably connected to said torch body;

a plasma gas supply conduit operably connected to said torch body;

an electrode for sustaining an arc with a workpiece; and a nozzle assembly capable of withstanding a maximum operating current for the arc passing therethrough of no more than about 200 amperes, said nozzle assembly comprising:

an inner nozzle defining a longitudinal axis and a bore centered around said axis, said inner nozzle directing a gas flow through said bore at a predetermined gas flow velocity; and an outer nozzle defining a bore concentric with said inner nozzle bore such that the gas flows through both bores to a workpiece, said outer nozzle being mounted adjacent to said inner nozzle to define a water passage therebetween for directing a water flow at a predetermined water flow velocity to surround the gas flow, said gas flow velocity being higher than the water flow velocity.

30. A method for operating a water injection plasma arc torch at low current levels, said method comprising the steps of:

directing a gas through a nozzle assembly at a predetermined gas flow velocity; and directing a water flow through said nozzle assembly at a predetermined water flow velocity to surround the gas flow, said gas flow velocity being at least about 40 times the water flow velocity.

31. A method according to claim 30 including the step of limiting the operating current of an arc passing through said nozzle assembly to less than about 200 amperes.

* * * * *